US012555061B2

United States Patent
Rakshit et al.

(10) Patent No.: US 12,555,061 B2
(45) Date of Patent: Feb. 17, 2026

(54) INTELLIGENT AGGREGATED HIERARCHICAL eSIM PROFILE MANAGEMENT FOR LOGISTICS AND SUPPLY CHAIN

(71) Applicant: International Business Machines Corporation, Armonk, NY (US)

(72) Inventors: Sarbajit K. Rakshit, Kolkata (IN); Sathya Santhar, Ramapuram (IN)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 17/656,479

(22) Filed: Mar. 25, 2022

(65) Prior Publication Data
US 2023/0325758 A1  Oct. 12, 2023

(51) Int. Cl.
*G06Q 10/083* (2024.01)
*G06Q 10/0639* (2023.01)
(Continued)

(52) U.S. Cl.
CPC ..... *G06Q 10/083* (2013.01); *G06Q 10/06395* (2013.01); *G06Q 10/08355* (2013.01); *G06Q 10/0875* (2013.01); *G06Q 50/04* (2013.01)

(58) Field of Classification Search
CPC ........... G06Q 10/083; G06Q 10/06395; G06Q 10/08355; G06Q 10/0875; G06Q 50/04; G06Q 50/40; G06Q 50/60
See application file for complete search history.

(56) References Cited

U.S. PATENT DOCUMENTS 8,086,337 B1 * 12/2011 Green .............. G06Q 10/06313
705/28
2003/0055753 A1  3/2003 Dellar
(Continued)

FOREIGN PATENT DOCUMENTS

CN  111813857 A  * 10/2020  ........... G06F 21/602
WO  2020101607 A2   5/2020

OTHER PUBLICATIONS

Arm, "eSIM: Giving Manufacturers the Competitive Edge in Logistics", Arm Ltd., 2020, 9 Pages.
(Continued)

*Primary Examiner* — Kamini S Shah
*Assistant Examiner* — Zachary Andrew Cain
(74) *Attorney, Agent, or Firm* — Monchai Chuaychoo

(57) ABSTRACT

In an approach for validating a sequence of assembly of a product and dynamically updating an eSIM profile associated with each component part of the product so that a user can track a degree of progress of the sequence of assembly, a processor receives a delivery request from a user to assemble and to deliver a product. A processor coordinates a sequence of assembly of one or more component parts to assemble the product while in transit via an autonomous vehicle. A processor tracks a degree of progress of the sequence of assembly using a blockchain enabled system. Responsive to determining the product is assembled, a processor performs a digital twin simulation of an assembly to determine whether the assembly was completed as per the sequence of assembly. A processor dynamically updates an eSIM profile of each component part of the product with a status of assembly.

20 Claims, 7 Drawing Sheets

(51) Int. Cl.
   *G06Q 10/0875* (2023.01)
   *G06Q 50/04* (2012.01)

(56) References Cited

U.S. PATENT DOCUMENTS

| | | | |
|---|---|---|---|
| 2018/0012311 A1* | 1/2018 | Small | G06Q 20/389 |
| 2019/0180291 A1* | 6/2019 | Schmeling | G16H 20/10 |
| 2019/0217475 A1* | 7/2019 | Neuhaus | B25J 9/1694 |
| 2020/0377230 A1* | 12/2020 | Watkins | B64F 5/10 |
| 2021/0224727 A1* | 7/2021 | Rakhunde | G06K 7/0008 |
| 2022/0012688 A1 | 1/2022 | Rakshit | |
| 2022/0156680 A1* | 5/2022 | Tripathy | G06Q 10/047 |

OTHER PUBLICATIONS

Carron et al., "Delivering Industrial IoT at scale through out-of-the-box eSIM connectivity: A guide", IoT Tech News, Jul. 6, 2020, 77 Pages.

Galea-Pace, Sean, "Arm: A competitive edge in logistics through eSIM", SupplyChain, Aug. 27, 2020, 4 Pages.

Ma et al., "Digital Twin-Assisted Simulation of Complex Assembly Models in Descending Process and Implementation of Key Link Characterization", Hindawi, Journal of Sensors, vol. 2021, Article ID: 2166075, Dec. 20, 2021, 12 pages.

Manimuthu et al., "Design and development of automobile assembly model using federated artificial intelligence with smart contract", International Journal of Production Research, Oct. 26, 2021, 26 Pages.

Mayron, Yuval, "Who is set to benefit from eSIM technology?" IoT Now Magazine, Nov. 4, 2021, 12 Pages.

\* cited by examiner

US 12,555,061 B2

INTELLIGENT AGGREGATED HIERARCHICAL eSIM PROFILE MANAGEMENT FOR LOGISTICS AND SUPPLY CHAIN

BACKGROUND OF THE INVENTION

The present invention relates generally to the field of data processing, and more particularly to intelligent aggregated hierarchical eSIM profile management for logistics and supply chain.

A supply chain is a network between a company and its suppliers to produce and distribute a specific product to the final buyer. This network includes different activities, people, entities, information, and resources. The supply chain also represents the sequence of processes involved in the production and distribution of a product or service from its original state to the customer.

Management of the supply chain is crucial because an optimized supply chain results in lower costs and a faster production cycle. Supply chain management is the handling of the entire production flow of a good or service—starting from the raw components all the way to delivering the final product to the customer.

The Internet of Things (IoT) has played a part in improving the efficiency of the supply chain. Embedded SIMs (eSIMs) have also played a part and have complemented and extended IoT's contribution to the supply chain. eSIM, also referred to as Remote SIM Provisioning (RSP), is a service that delivers replaceable network access profiles to a SIM card. eSIM gives users the ability to securely download, attach, enable, and disable profiles remotely. eSIM describes the various components, including RSP-capable SIM hardware (an eUICC), eSIM profiles, and the different RSP platform functions that facilitate the remote provisioning of SIM profiles. An eSIM profile holds a device's unique identity. It matches the customer's subscription agreement with a specific network operator and, by enabling an eSIM profile on the eUICC, SIM grants it access to the operator's network. Crucially, an eSIM profile is replaceable, with a new profile provisioned on an eUICC SIM using the RSP process. eSIM profiles broadly fall into two category types: an initial activation—or "Bootstrap" profile—and one and possibly more operational profiles.

SUMMARY

Aspects of an embodiment of the present invention disclose a method, computer program product, and computer system for validating a sequence of assembly of a product and dynamically updating an eSIM profile associated with each component part of the product so that a user can track a degree of progress of the sequence of assembly. A processor receives a delivery request from a user to assemble and to deliver a product. A processor identifies one or more suppliers of one or more component parts of the product. A processor coordinates a sequence of assembly of the one or more component parts to assemble the product while in transit via an autonomous vehicle. A processor tracks a degree of progress of the sequence of assembly of the one or more component parts using a blockchain enabled system. Responsive to determining whether the product is assembled, a processor performs a digital twin simulation of an assembly of the one or more component parts to determine whether the assembly of the one or more component parts was completed as per the sequence of assembly. A processor dynamically updates an eSIM profile of each component part of the one or more component parts of the product with a status of assembly of each component part.

In some aspects of an embodiment of the present invention, subsequent to performing the digital twin simulation of the assembly of the one or more component parts to determine whether the assembly of the one or more component parts was completed as per the sequence of the assembly, a processor creates a list detailing the sequence of assembly of the one or more component parts of the product, wherein the list details an order in which the one or more component parts were assembled. A processor groups one or more eSIM profiles based on a position of the eSIM profile in the sequence of assembly of the product. A processor arranges the one or more eSIM profiles to show a hierarchical relationship among the one or more component parts of the product.

In some aspects of an embodiment of the present invention, a processor updates an insurance policy of the product using a smart contract rule based on the determination that the product is assembled.

In some aspects of an embodiment of the present invention, subsequent to updating dynamically the eSIM profile of each component part of the one or more component parts of the product with the status of assembly of each component part, a processor tracks the product for one or more alterations using the blockchain enabled system. A processor determines whether the product was altered. Responsive to determining the product was altered, a processor disassociates the one or more component parts removed from the product from tracking. A processor dynamically updates the eSIM profile of each component part of the one or more component parts of the product with the status of assembly of each component part.

In some aspects of an embodiment of the present invention, a processor analyzes the delivery request using a Natural Language Processing technique. A processor identifies the product. A processor identifies a bill of materials of the product. A processor extracts textual data from the delivery request and the bill of materials of the product.

In some aspects of an embodiment of the present invention, the textual data extracted from the bill of materials of the product includes information corresponding to a delivery destination of the product, a delivery date of the product, a location of one or more suppliers of the one or more component parts, and an identifier of one or more autonomous vehicles that will assemble and deliver the one or more component parts.

In some aspects of an embodiment of the present invention, a processor determines one or more common delivery routes of the one or more component parts of the product, wherein the one or more common delivery routes of the one or more component parts of the product include one or more respective routes from a location of the one or more suppliers to the delivery destination of the product. A processor determines a delivery route to the delivery destination of the product based at least in part on the one or more common delivery routes, wherein determining the delivery route to the delivery destination of the product further comprises identifying a route from a first supplier of the one or more suppliers of the one or more component parts to the delivery route to the delivery destination of the product; inputting a geolocation of the one or more suppliers of the one or more component parts and the delivery destination of the product into a machine learning model; and responsive to receiving an output corresponding to an input of the geolocation of the one or more suppliers of the one or more component parts and the delivery destination of the product into the machine learning model, identifying the one or more common delivery routes of a plurality of respective routes within a predetermined threshold distance to the delivery route.

These and other features and advantages of the present invention will be described in, or will become apparent to those of ordinary skill in the art in view of, the following detailed description of the example embodiments of the present invention.

DETAILED DESCRIPTION

Figure 1:
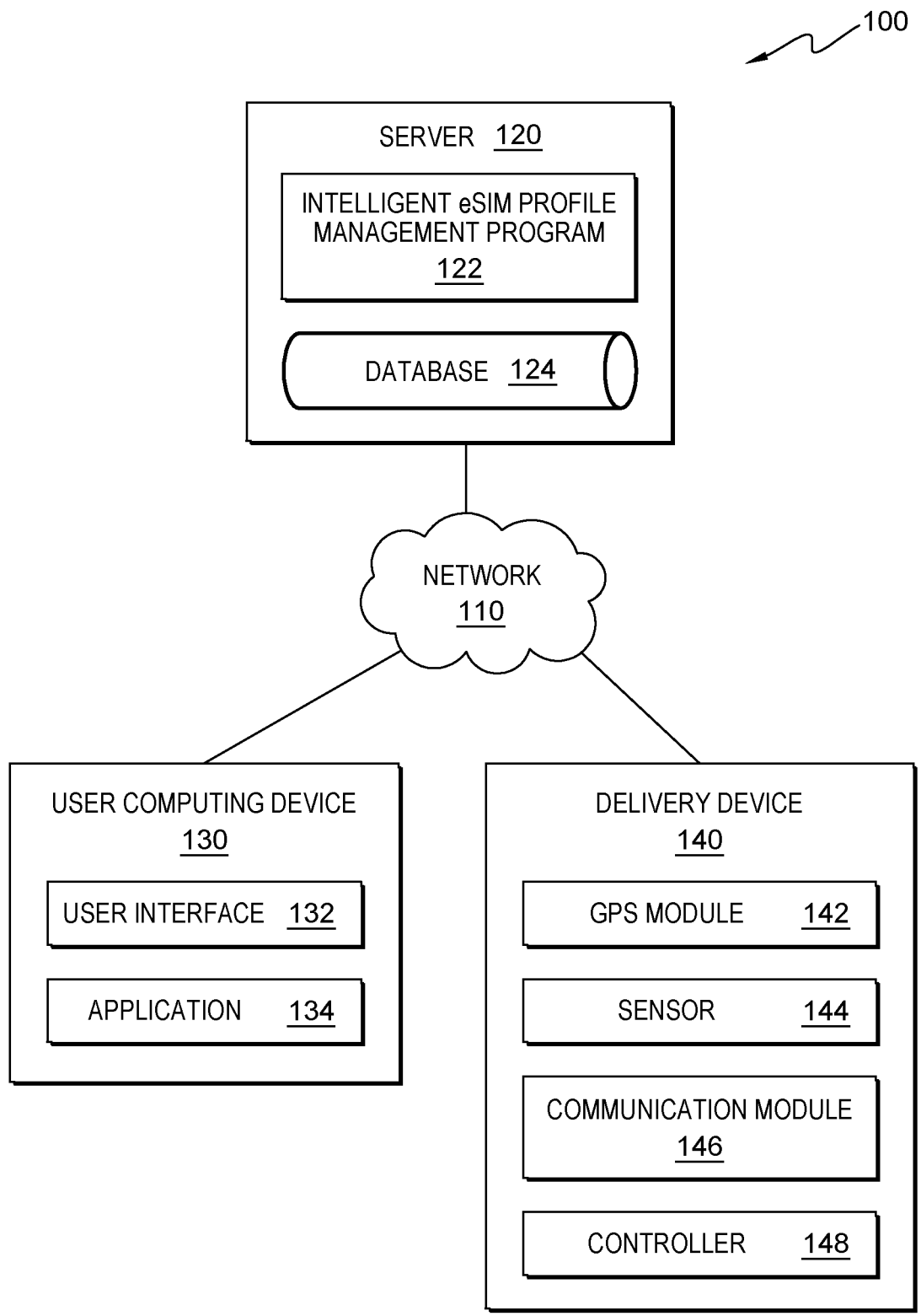
FIG. 1 is a functional block diagram illustrating a distributed data processing environment, in accordance with an embodiment of the present invention.

Embodiments of the present invention recognize that companies develop supply chains to reduce costs and to remain competitive in the business landscape. A supply chain is a network between a company and its suppliers to produce and distribute a specific product to the customer. This network includes different activities, people, entities, information, and resources. The supply chain also represents the sequence of processes involved in the production and distribution of a product or service from its original state to the customer.

Management of the supply chain is crucial because an optimized supply chain results in lower costs and a faster production cycle. Supply chain management is the handling of the entire production flow of a good or service—starting from the raw components all the way to delivering the final product to the consumer. A company creates a network of suppliers (i.e., "links" in the chain) who move the product from the suppliers of the raw materials to those organizations that deal directly with the customers. There are five components of traditional supply chain management systems: planning, sourcing, manufacturing, delivery and logistics, and returning. Planning refers to planning and managing all resources required to meet customer demand for a company's product or service. When the supply chain is established, planning refers to determining metrics to measure whether the supply chain is efficient, effective, delivers value to customers and meets company goals. Sourcing refers to choosing suppliers to provide the goods and services needed to create the product. Sourcing also refers to establishing processes to monitor and manage supplier relationships. Manufacturing refers to organizing the activities required to accept raw materials, manufacture the product, check the product for quality, package the product for shipping, and schedule the product for delivery. Delivery and logistics refer to coordinating customer orders, scheduling deliveries, dispatching loads, invoicing customers, and receiving payments. Returning refers to creating a network or process to take back defective, excess, or unwanted products.

Embodiments of the present invention recognize that challenges exist in a supply chain network. One of the challenges that exists in the supply chain network is the inability to effectively track a product during the assembly process to know when the product is assembled either partially or completely.

Typically, the manufacturing process draws on a complex mosaic of inputs and sources. It's very much product-dependent, but there could be thousands, even millions of individual components. For example, a commercial airplane could have 3 million parts supplied by 500 different subcontractors. Conversely, even the most straightforward products, requiring just a few essential elements, often source from geographically dispersed suppliers. Regardless of the amount, the individual components are assembled on an assembly line to create a final product.

IoT has played a part in improving the efficiency of the supply chain. eSIM has also played a part and has complemented and extended IoT's contribution to the supply chain. More specifically, eSIM contributes to the inventory management aspect of the supply chain. With eSIM, low-cost sensors have more widely been integrated into all manners of upstream supply chain logistics that handle the various components, ingredients, and elements. This translates into a significantly more granular view of inventory status. That means, each of the individual components have an eSIM embedded in the component so that the part can be tracked along the transportation route, that is from the supplier to the manufacturer to the customer.

Embodiments of the present invention recognize that an unplanned variation in upstream and downstream material flows can result in a mismatch of supply and demand. This is referred to as supply chain volatility. For example, supply chain volatility can occur with increasing volumes of internationally-sources goods that cause port congestion. The port congestion in effect creates additional pressures as ships, trucks, and trains need to wait to load, unload, and transfer products. When supply chain volatility exists in a supply chain, processes across the supply chain are challenged. Supply chain managers must deal with these issues promptly. Failure to adapt to this volatility can lead to delays, backlogs, bottlenecks, and, ultimately, unmet demand—and unmet demand translates into lost sales, lost profits, lost customers, and eventually loss in market shares.

Embodiments of the present invention provide a system and method to validate a sequence of assembly of a product and to dynamically update an eSIM profile associated with each component part of the one or more component parts of the product so that a user can track a degree of progress of the sequence of assembly.

Implementation of embodiments of the present invention may take a variety of forms, and exemplary implementation details are discussed subsequently with reference to the Figures.

FIG. 1 is a functional block diagram illustrating a distributed data processing environment, generally designated 100, in accordance with an embodiment of the present invention. In the depicted embodiment, distributed data processing environment 100 includes server 120, user computing device 130, and delivery device 140, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, delivery device 140, and other computing devices (not shown) within distributed data processing environment 100.

Server 120 operates to run intelligent eSIM profile management program 122 and to send and/or store data in database 124. In an embodiment, server 120 can send data from database 124 to user computing device 130. In another embodiment, server 120 can send data from database 124 to delivery device 140. In an embodiment, server 120 can receive data in database 124 from user computing device 130. In another embodiment, server 120 can receive data in database 124 from delivery device 140. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130, delivery device 140, and other computing devices (not shown) within distributed data processing environment 100 via network 110. Server 120 may include internal and external hardware components, as depicted and described in further detail in FIG. 6.

Intelligent eSIM profile management program 122 operates to validate a sequence of assembly of a product and to dynamically update an eSIM profile associated with each component part of the one or more component parts of the product so that a user can track a degree of progress of the sequence of assembly. In the depicted embodiment, intelligent eSIM profile management program 122 is a standalone program. In another embodiment, intelligent eSIM profile management program 122 may be integrated into another software product, such as an enterprise resource planning (ERP) software, a manufacturing execution system software, or a quality management system software. In the depicted embodiment, intelligent eSIM profile management program 122 resides on server 120. In another embodiment, intelligent eSIM profile management program 122 may reside on user computing device 130, delivery device 140, or on another computing device (not shown), provided that intelligent eSIM profile management program 122 has access to network 110. The operational steps of intelligent eSIM profile management program 122 are depicted and described in further detail with respect to FIGS. 2A and 2B. The operational steps of an assembly component of intelligent eSIM profile management program 122 are depicted and described in further detail with respect to FIG. 3. An example illustration of an assembly environment in which intelligent eSIM profile management program 122 operates is depicted and described in further detail with respect to FIG. 4. An example illustration of a delivery environment in which intelligent eSIM profile management program 122 operates is depicted and described in further detail with respect to FIG. 5.

In an embodiment, a user of user computing device 130 registers with server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via intelligent eSIM profile management program 122). Information to create a user profile includes, but is not limited to, user specific data. In an embodiment, intelligent eSIM profile management program 122 collects user specific data from the user through user interface 132 of user computing device 130. The user specific data provided includes, but is not limited to, a name of the user, a name of a company owned by the user, a location of the company owned by the user, one or more types of products produced by the company owned by the user, one or more manufacturing equipment utilized by the user or available for the user to utilize, one or more resources utilized or available for the user to utilize, a number of employees of the company owned by the user, and job functions of the employees of the company owned by the user.

Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

In an embodiment, intelligent eSIM profile management program 122 creates a user profile. In an embodiment, intelligent eSIM profile management program 122 creates a user profile with user-specific data collected. In an embodiment, intelligent eSIM profile management program 122 stores the user profile in a database, e.g., database 124. In an embodiment, intelligent eSIM profile management program 122 stores the user profile in a database for future iterations of intelligent eSIM profile management program 122.

Database 124 operates as a repository for data received, used, and/or generated by intelligent eSIM profile management program 122. A database is an organized collection of data. Data includes, but is not limited to, information about user profiles, user preferences (e.g., general user system settings such as alert notifications for user computing device 130); information about alert notification preferences; user specific data; previous delivery requests of a user; unique identifiers of products; bills of materials with corresponding products; lists of the one or more component parts of products; the location of the one or more suppliers of the one or more component parts of products; eSIM profiles of each component part of the one or more component parts of products; lists detailing the sequence of assembly of the one or more component parts of products; insurance policies with corresponding products; feedback received from the user; and any other data received, used, and/or generated by intelligent eSIM profile management program 122.

Database 124 can be implemented with any type of device capable of storing data and configuration files that can be accessed and utilized by server 120, such as a hard disk drive, a database server, or a flash memory. In an embodiment, database 124 is accessed by intelligent eSIM profile management program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that intelligent eSIM profile management program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, disseminating, or otherwise making available, combining, restricting, erasing, or destroying personal and/or confidential company data. Intelligent eSIM profile management program 122 enables the authorized and secure processing of personal data.

Intelligent eSIM profile management program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Intelligent eSIM profile management program 122 provides information regarding personal and/or confidential data and the nature (e.g., type, scope, purpose, duration, etc.) of the processing. Intelligent eSIM profile management program 122 provides the user with copies of stored personal and/or confidential company data. Intelligent eSIM profile management program 122 allows the correction or completion of incorrect or incomplete personal and/or confidential data. Intelligent eSIM profile management program 122 allows for the immediate deletion of personal and/or confidential data.

User computing device 130 operates to run user interface 132 through which a user can interact with intelligent eSIM profile management program 122 on server 120 and to run application 134. In an embodiment, user computing device 130 is a device that performs programmable instructions. For example, user computing device 130 may be an electronic device, such as a laptop computer, a tablet computer, a netbook computer, a personal computer, a desktop computer, a workstation, a digital video recorder (DVR), a media player, a smart phone, a personal digital assistant, a smart warehouse, or any programmable electronic device capable of running user interface 132 and of communicating (i.e., sending and receiving data) with intelligent eSIM profile management program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132 and application 134.

User interface 132 operates as a local user interface between intelligent eSIM profile management program 122 on server 120 and a user of user computing device 130. User interface 132 also operates as a local user interface between intelligent eSIM profile management program 122 on server 120 and a plurality of applications (e.g., application 134) that reside on user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from intelligent eSIM profile management program 122 to a user via network 110. In another embodiment, user interface 132 is a script or application programming interface (API).

User interface 132 can also display or present alerts including information (such as graphics, text, and/or sound) sent from intelligent eSIM profile management program 122 to a user via network 110. In an embodiment, user interface 132 is capable of sending and receiving data (i.e., to and from intelligent eSIM profile management program 122 via network 110, respectively). Through user interface 132, a user can opt-in to intelligent eSIM profile management program 122; create a user profile; set user preferences and alert notification preferences; input a delivery request; track the assembly status of the one or more component parts; receive the list detailing the sequence of assembly of the one or more component parts; track the disassembly status of the one or more component parts removed from the product; receive a request for feedback; and input feedback.

A user preference is a setting that can be customized for a particular user. A set of default user preferences are assigned to each user of intelligent eSIM profile management program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, information from past results of iterations of intelligent eSIM profile management program 122 including, but not limited to, a sequence of assembly of a product; a grouping of one or more eSIM profiles based on a position of the eSIM profile in the sequence of assembly of the product; a hierarchical relationship among the one or more component parts of the product; a location of one or more suppliers of one or more component parts; an identifier of one or more autonomous vehicles that assembled and delivered one or more component parts; a delivery destination of a product; a delivery date of a product; one or more common delivery routes of the one or more component parts of the product; and a delivery route to the delivery destination of the product.

Application 134 is a computer program designed to run on user computing device 130. An application frequently serves to provide a user with similar services accessed on personal computers (e.g., web browser, playing music, e-mail program, or other media, etc.). In one embodiment, application 134 is mobile application software. For example, mobile application software, or an "app," is a computer program designed to run on smart phones, tablet computers and other mobile devices. In another embodiment, application 134 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 134 is a client-side application of intelligent eSIM profile management program 122. For example, intelligent eSIM profile management program 122 utilizes application 134 to transmit a bill of material and/or information (e.g., availability of one or more components) corresponding to a delivery request.

Delivery device 140 is an unmanned electro-mechanical device that includes a ground-based controller, either under remote control by a human operator or autonomously by onboard computers (e.g., an autonomous vehicle) that is capable of executing computer readable program instructions, in accordance with embodiments of the present invention. Delivery device 140 is representative of any electronic device or combination of electronic devices capable of executing computer readable program instructions. Delivery device 140 may include one or more speakers, a camera, a processor, global positioning system (GPS) module 142, sensor 144, communications module 146, and controller 148.

GPS module 142 is a global navigation system that provides geolocation information of delivery device 140. In an embodiment, GPS module 142 provides geolocation information of delivery device 140 to intelligent eSIM profile management program 122. For example, a geo-spatial metrics module (e.g., GPS module 142) provides real-time geolocation data for an autonomous vehicle (e.g., delivery device 140) to intelligent eSIM profile management program 122. In another example, a geo-spatial metrics module (e.g., GPS module 142) provides real-time geolocation data for a first autonomous vehicle (e.g., delivery device 140) to a second autonomous vehicle (not shown). In an embodiment, GPS module 142 may be a global positioning system (GPS) or satellite receivers to navigate delivery device 140 to a predetermined location. For example, GPS module 142 can be utilized to transmit delivery deposit locations and routes to delivery device 140.

Sensor 144 is a device, module, machine, or subsystem that detects events or changes in an environment of the device and sends the information to other electronics. In one embodiment, sensor 144 represents a variety of sensors of delivery device 140 that collect and provide various types of data. In this embodiment, sensor 144 provides information about delivery device 140 to server 120. For example, sensor 144 can capture information about delivery device 140 and/or an operating environment of delivery device 140. In this example, sensor 144 can capture proximity, image, speed, acceleration, wind conditions, etc. of an autonomous vehicle (e.g., delivery device 140) and transmit the information of delivery device 140 to database 124. Alternatively, the information of delivery device 140 may be transmitted to an autonomous vehicle (not shown) in a context aware communication of communications module 146.

Communications module 146 may be a radio transmitter/receiver, application, or a computer utilized to transmit communications of delivery device 140. In one embodiment, delivery device 140 transports a product corresponding to a delivery request of a user to a predetermined location of the delivery request. For example, communications module 146 transmits a context aware communication to one or more autonomous vehicles that includes information about an environment of delivery device 140. In this example, a context aware communication includes a sequence of assembling, relative location of delivery device 140, and/or possibilities of parallel or sub-assemblies.

In another embodiment, communications module 146 transmits data of delivery device 140. For example, communications module 146 includes radio frequency identification (RFID) circuitry, which includes an RFID tag that comprises a radio transponder, a radio receiver, and a transmitter. In this example, the RFID tag is utilized to identify delivery device 140. Additionally, communications module 146 utilizes the RFID tag to authenticate an autonomous vehicle prior to transmitting a context aware communication. In another example, communications module 146 may transmit context aware communications to coordinate two or more autonomous vehicles (e.g., delivery device 140) through near-field communications (e.g., network 110).

Controller 148 may be a wireless controller for delivery device 140, as delivery device 140 is considered to be autonomous based on onboard computers that are capable of executing computer readable program instructions, in accordance with embodiments of the present invention. In one embodiment, controller 148 provides delivery device 140 with instructions to perform maneuvers corresponding to a task of intelligent eSIM profile management program 122. For example, intelligent eSIM profile management program 122 determines that delivery device 140 should coordinate (e.g., task) with an autonomous vehicle (not shown). Controller 148 transmits signals to delivery device 140 to taxi (e.g., maneuver) at a predefined geolocation in place while the autonomous vehicle coordinates with delivery device 140.

Figure 2A:
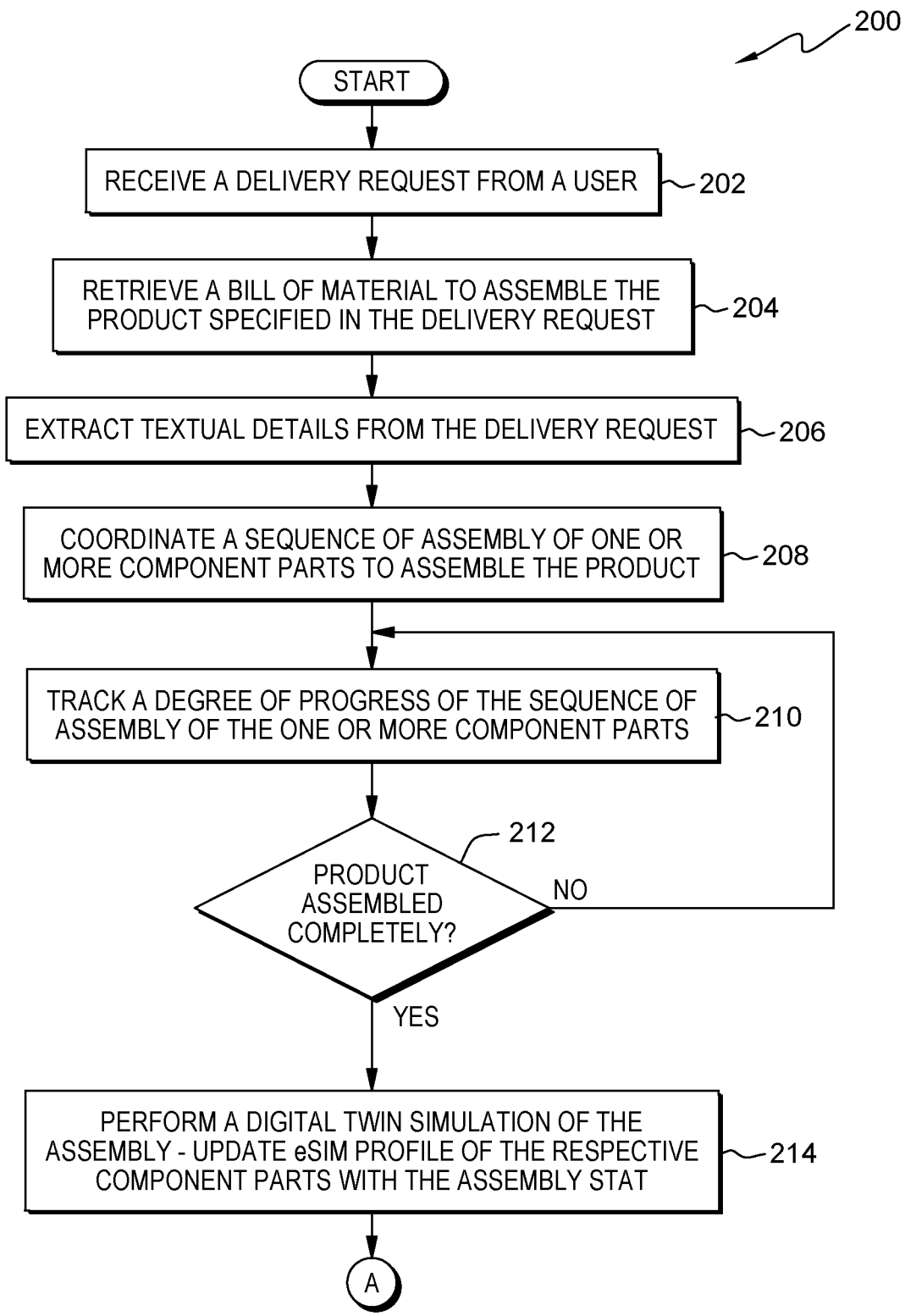
FIGS. 2A and 2B are a flowchart illustrating the operational steps of an intelligent eSIM profile management program, on a server within the distributed data processing environment of FIG. 1, in accordance with an embodiment of the present invention.
Figure 2B:
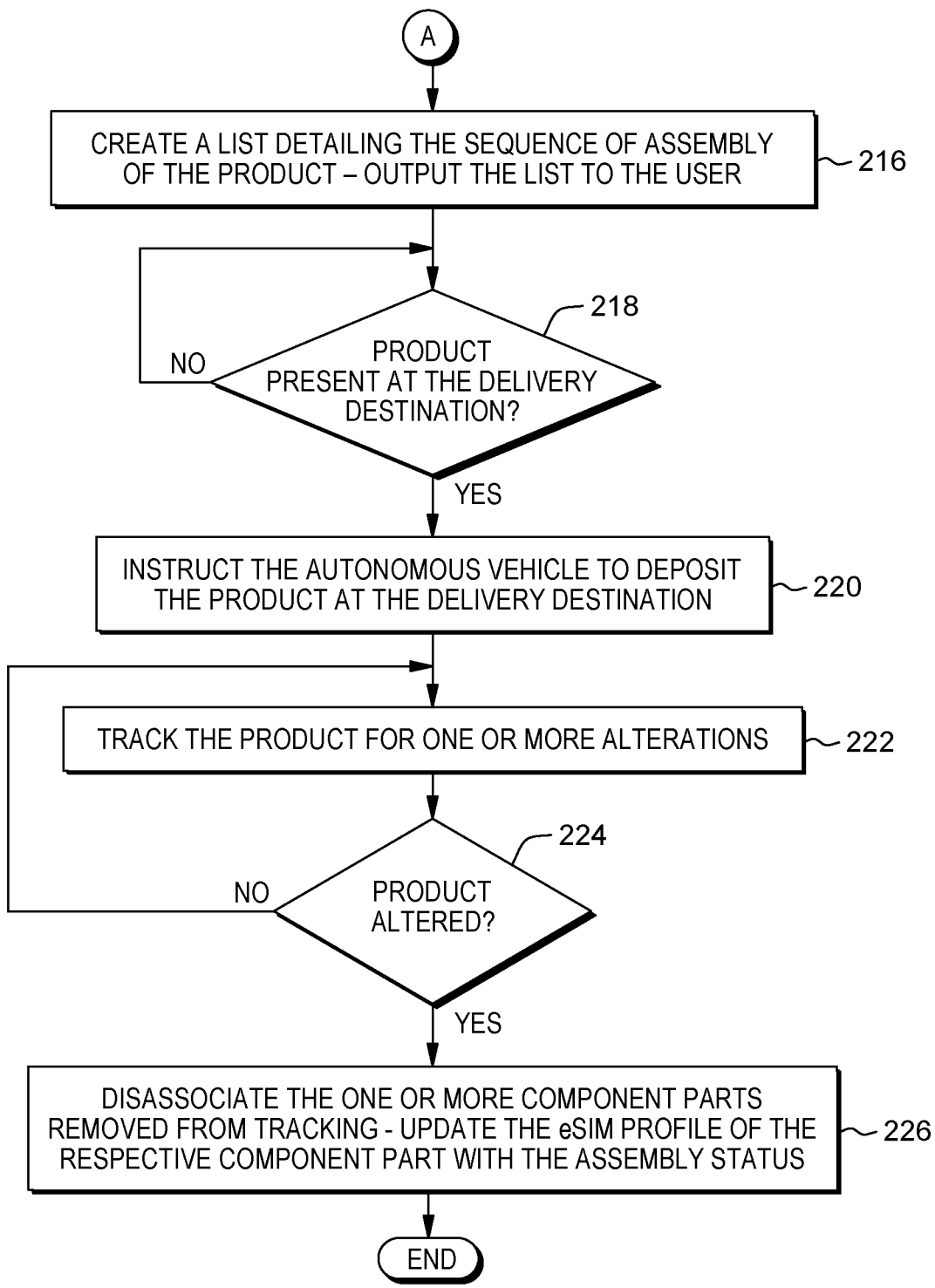

FIGS. 2A and 2B are a flowchart, generally designated 200, illustrating the operational steps of intelligent eSIM profile management program 122, on server 120 within distributed data processing environment 100 of FIG. 1, in accordance with an embodiment of the present invention. In an embodiment, intelligent eSIM profile management program 122 operates to validate a sequence of assembly of a product and to dynamically update an eSIM profile associated with each component part of the one or more component parts of the product so that a user can track a degree of progress of the sequence of assembly. It should be appreciated that the process depicted in FIG. 2 illustrates one possible iteration of the process flow, which may be repeated for each delivery request received from a user.

In step 202, intelligent eSIM profile management program 122 (hereinafter referred to as "program 122") receives a delivery request from a user. In an embodiment, program 122 receives a delivery request from a user to assemble a product while in transit via an autonomous vehicle and to deliver the product to a delivery destination. In an embodiment, program 122 receives a delivery request from a user through an application (e.g., application 134) on a user computing device (e.g., user computing device 130). In another embodiment, program 122 retrieves a delivery request of a user from a database (e.g., database 124) of a remote server (e.g., server 120). In an embodiment, program 122 analyzes the delivery request using a Natural Language Processing (NLP) technique. The NLP techniques include, but are not limited to, parsing, natural language understanding, and topic segmentation. In an embodiment, program 122 analyzes the delivery request to identify the product to be assembled and delivered.

In step 204, program 122 retrieves a bill of materials (BOM) to assemble the product from the delivery request. In an embodiment, responsive to receiving a delivery request from a user, program 122 retrieves a BOM to assemble the product from the delivery request. In another embodiment, program 122 retrieves the BOM to assemble the product from the database (e.g., database 124) of the remote server (e.g., server 120). A plurality of products are stored in the database (e.g., database 124) of the remote server (e.g., server 120) with a corresponding BOM. Each product and corresponding BOM is assigned a unique identifier. The corresponding BOM includes a list of the one or more component parts and a sequence of assembly of the one or more component parts.

A BOM is a list of one or more component parts (i.e., the basic parts with which the product is produced) and the quantities of each component part needed to produce the product as well as a sequence of assembly of the one or more component parts. A BOM may be used for communication between manufacturing partners or confined to a single manufacturing plant. A BOM is often tied to a production order whose issuance may generate reservations for the one or more component parts in the BOM that are in stock and requisitions for the one or more component parts that are not in stock. A BOM may define the product as it is designed (i.e., an engineering BOM), as it is ordered (i.e., a sales BOM), as it is built (i.e., a manufacturing BOM), or as it is maintained (i.e., a service BOM). BOMs are of a hierarchical nature, with the top level representing the product which may be a sub-assembly or a completed item. BOMs that describe the sub-assemblies are referred to as modular BOMs.

For example, program 122 monitors an order receiving system (e.g., client-side of application 134) of a user computing device (e.g., user computing device 130). Program 122 receives a receipt of a communication from a customer (e.g., a user of application 134). Program 122 analyzes the delivery request using a NLP technique (e.g., parsing, natural language understanding, and topic segmentation). Program 122 identifies a product to be assembled and delivered in the delivery request (e.g., robotic toy, wall clock, or toy vehicles). Program 122 identifies a unique identifier of the product and the corresponding BOM and retrieves the BOM from the database (e.g., database 124) of the remote server (e.g., server 120).

In another example, program 122 retrieves a delivery request of a customer stored in a database (e.g., database 124) of a remote server (e.g., server 120). Program 122 analyzes the delivery request using NLP techniques (e.g., parsing, natural language understanding, and topic segmentation). Program 122 identifies a product to be assembled and delivered in the delivery request (e.g., robotic toy, wall clock, or toy vehicles). Program 122 identifies the BOM to assemble the product in the delivery request.

In step 206, program 122 extracts textual data from the delivery request by parsing the delivery request. In an embodiment, responsive to retrieving a BOM to assemble the product from the delivery request, program 122 extracts textual data from the delivery request by parsing the delivery request. The textual data extracted from the delivery request may include, but is not limited to, information corresponding to a delivery destination of the product (i.e., an address where the product will be delivered), a delivery date of the product (i.e., a date when the product will be delivered), a location of one or more suppliers of the one or more component parts (e.g., an address, a geolocation, and a set of coordinates), and an identifier of one or more autonomous vehicles that will assemble and deliver the one or more component parts.

In an embodiment, program 122 extracts textual data from the BOM by parsing the BOM. The textual data extracted from the BOM may include, but is not limited to, the list of the one or more component parts required to assemble the product, the sequence of assembly of the one or more component parts, the location of the one or more suppliers of the one or more component parts, and the identifier of the one or more autonomous vehicles that will assemble and transport the one or more component parts.

For example, program 122 extracts the delivery destination and the delivery date from the delivery request. Program 122 extracts the list of the one or more component parts and the location of the one or more suppliers of the one or more component parts by parsing the BOM stored in the database (e.g., database 124) of the remote server (e.g., server 120). Program 122 extracts the number of autonomous vehicles (e.g., delivery device 140) to assemble and to transport the one or more component parts to the delivery destination and the identification of the autonomous vehicles from one or more components of the autonomous vehicle transport.

Figure 4:
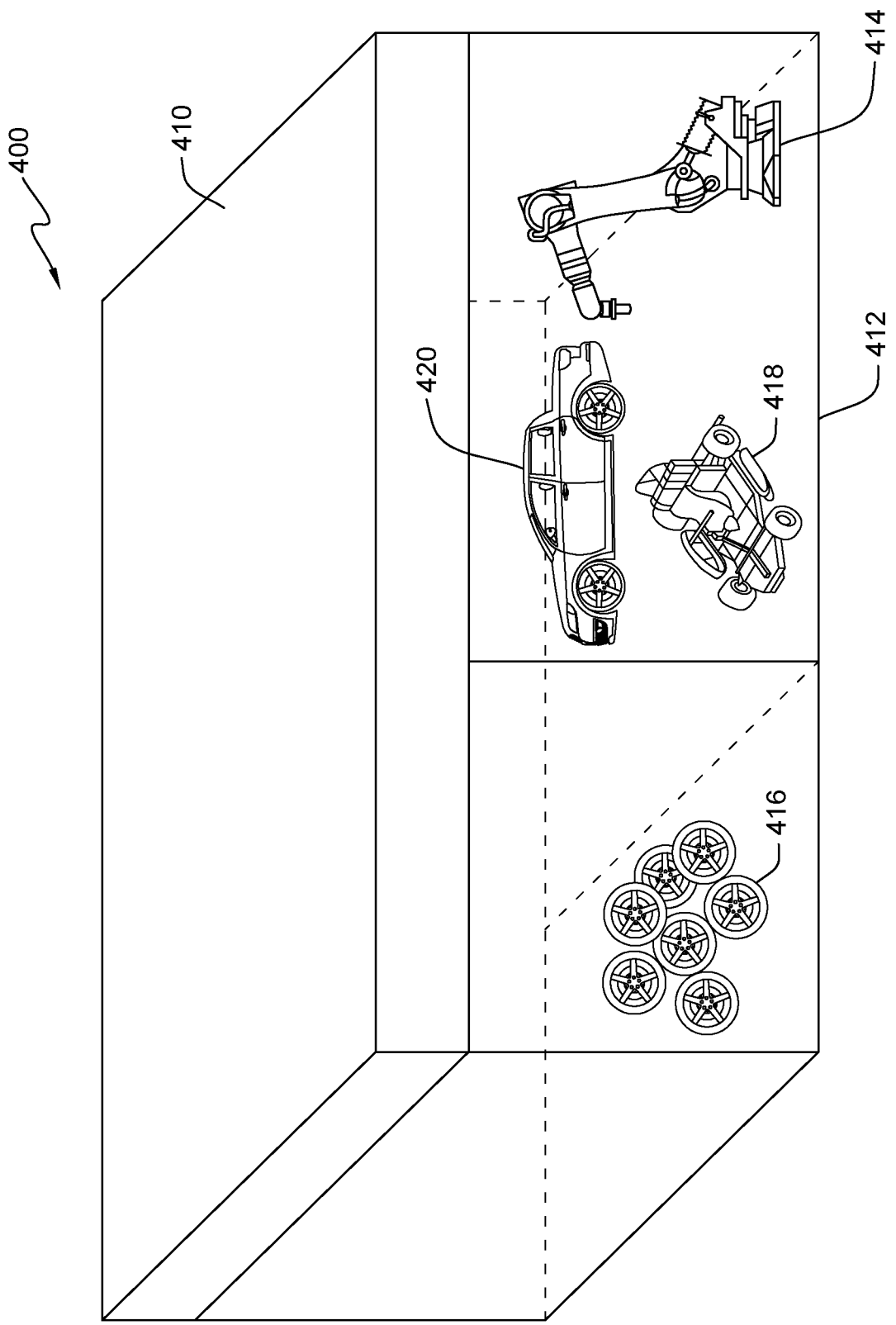
FIG. 4 depicts an example illustration of an assembly environment in which the intelligent eSIM profile management program operates, in accordance with example embodiments of the present invention.

Referring to FIG. 4, FIG. 4 depicts an example illustration of assembly environment 400, in which program 122 controls an autonomous vehicle to assemble and transport the product, in accordance with example embodiments of the present invention. Assembly environment 400 includes vehicle 410, chamber 412, assembly arm 414, component part 416, unfinished product 418, and final product 420. Vehicle 410 is an autonomous vehicle for assembling and delivering the product. Chamber 412 is a storage area below vehicle 410 that program 122 utilizes to transport items, assemble items, store component parts, and/or 3D print spare component parts. Assembly arm 414 is a robotic arm used for several manufacturing applications, including welding, material handling and material removal. Component part 416 can represent individual components, which may be spring, gear wheel, battery, control circuit, pivotal joint, body parts of any final product, etc. Unfinished product 418 is an item corresponding to a delivery request of a user that has not finished its sequence of assembly. Final product 420 is an item corresponding to a delivery request of a user that has completed its sequence of assembly. In an example embodiment with respect to FIG. 4, program 122 controls assembly arm 414 to assemble component part 416 into final product 420.

In step 208, program 122 coordinates a sequence of assembly of the one or more component parts to assemble the product. In an embodiment, responsive to extracting textual data from the delivery request by parsing the delivery request, program 122 coordinates a sequence of assembly of the one or more component parts to assemble the product. Each of the one or more component parts contain an embedded SIM (eSIM). The eSIM tracks the one or more component parts along the transportation route of the autonomous vehicle (i.e., from the supplier to the manufacturer to the customer). Each component part of the one or more component parts has a unique identification. The unique identification is based on the sequence in which the one or more component parts are required to assemble the product. Each component part is provided by the one or more suppliers. The one or more suppliers may be located along the transportation route of the autonomous vehicle (i.e., from the supplier to the manufacturer to the customer). When the one or more suppliers delivers a component part to the autonomous vehicle (e.g., delivery device 140), program 122 operates assembly arm 414 to assemble the one or more component parts either immediately or after a set period of time. However, the one or more component parts may only be assembled in sequential order. Step 208 is described in further detail with respect to flowchart 300 in FIG. 3.

In step 210, program 122 tracks a degree of progress of the sequence of assembly of the one or more component parts using a blockchain enabled system. In an embodiment, responsive to coordinating a sequence of assembly of the one or more component parts to assemble the product, program 122 tracks a degree of progress of the sequence of assembly of the one or more component parts using a blockchain enabled system.

In decision step 212, program 122 determines whether the product is assembled completely. In an embodiment, responsive to tracking a degree of progress of the sequence of assembly of the one or more component parts using a blockchain enabled system, program 122 determines whether the product is assembled completely. In an embodiment, program 122 determines whether the product is assembled by reviewing the eSIM profile of each component part of the one or more component parts. The eSIM profile of each component part may include, but is not limited to, a specification of the component part, a purpose of the component part, a usage of the component part, and a name given to or associated with the component part. The eSIM profile of each component part is stored in the database (e.g., database 124). In an embodiment, program 122 determines whether the product is completely assembled by identifying the status of assembly of each component part through the eSIM profile of each component part. In another embodiment, program 122 determines whether the product is completely assembled by utilizing data of one or more instances of the autonomous vehicle (e.g., delivery device 140).

For example, program 122 determines whether the one or more autonomous vehicles assigned to assemble the product (e.g., delivery device 140) includes one or more pending assembly steps of the sequence of assembly of the product. Program 122 queries the one or more autonomous vehicles assigned to assemble the product to determine the status of assembly of each component part of the one or more component parts of the product.

If program 122 determines the product is completely assembled (decision step 212, YES branch), then program 122 proceeds to step 214, performing a digital twin simulation of the assembly of the one or more component parts to determine whether the assembly of the one or more component parts was completed as per the sequence of the assembly. If program 122 determines the product is not completely assembled (decision step 212, NO branch), then program 122 returns to step 210 to continue tracking the degree of progress of the sequence of assembly of the one or more component parts.

In step 214, program 122 performs a digital twin simulation of the assembly of the one or more component parts to determine whether the assembly of the one or more component parts was completed as per the sequence of the assembly. In an embodiment, responsive to determining the product is assembled completely, program 122 performs a digital twin simulation of the assembly of the one or more component parts to determine whether the assembly of the one or more component parts was completed as per the sequence of the assembly. In an embodiment, program 122 dynamically updates the eSIM profile of each component part to reflect the "assembly completed" status. In an embodiment, program 122 enables the user to view the "assembly completed" status through user interface 132 of user computing device 130.

In an embodiment, program 122 dynamically updates an insurance policy of the product using a smart contract rule. For example, program 122 dynamically updates an insurance policy of the product when it is completely assembled because the insurance price of one or more unassembled component parts is different than the insurance price of a completely assembled product.

Referring to FIG. 2B, in step 216, program 122 creates a list detailing the sequence of assembly of the product. In an embodiment, responsive to performing a digital twin simulation of the assembly of the one or more component parts to determine whether the assembly of the one or more component parts was completed as per the sequence of the assembly, program 122 creates a list detailing the sequence of assembly of the product. The list details the particular order in which the one or more component parts are assembled to produce the product. In an embodiment, program 122 groups the eSIMs of the one or more component parts used to assemble the product based on when the one or more component parts are assembled in the sequence. In an embodiment, program 122 arranges the one or more component parts to show the hierarchical relationship among the component parts. In an embodiment, program 122 dynamically updates the eSIM profile of each component part with the position given to each component part in the sequence. In an embodiment, program 122 outputs the list to the user through user interface 132 of user computing device 130.

In step 218, program 122 determines whether the product is present at the delivery destination. In an embodiment, responsive to creating a list detailing the sequence of assembly of the product, program 122 determines whether the product is present at the delivery destination. In various embodiments of the present invention, once the product is assembled, delivery device 140 can deliver the product to the user. In one embodiment, program 122 utilizes data of one or more instances of delivery device 140 to determine whether the product is present at the delivery destination of the user. For example, program 122 determines whether the autonomous vehicle (e.g., delivery device 140) that includes the product is present at a geolocation corresponding to the delivery destination. In this example, program 122 queries GPS module 142 of the autonomous vehicle assigned to deliver the product to a current geolocation to determine whether the autonomous vehicle is proximate (e.g., matching GPS coordinates) to the address of the delivery destination.

If program 122 determines that the product is not present at the delivery destination (decision step 218, "NO" branch), then program 122 continues to monitor the current geolocation (e.g., through GPS module 142) of the autonomous vehicle (e.g., delivery device 140). For example, program 122 queries the autonomous vehicle assigned to deliver an assembled product for a current geolocation to determine whether the autonomous vehicle is proximate (e.g., GPS coordinates do not match) to the address of a delivery destination. Responsive to determining the autonomous vehicle is not proximate to the address of the delivery destination, program 122 continues to monitor the current geolocation of the autonomous vehicle with respect to the address of the delivery destination.

If program 122 determines that the product is present at the delivery destination (decision step 218, "YES" branch), then program 122 proceeds to step 220, instructing the autonomous vehicle (e.g., delivery device 140) to deposit the product at the delivery destination. For example, program 122 queries GPS module 142 of the autonomous vehicle assigned to deliver the product for a current geolocation to determine whether the autonomous vehicle is proximate (e.g., GPS coordinates match) to the delivery destination. Responsive to determining the autonomous vehicle is proximate to the delivery destination, program 122 releases the assembled product to the user.

In step 220, program 122 instructs the autonomous vehicle (e.g., delivery device 140) to deposit the product at the delivery destination. In an embodiment, responsive to determining the product is present at the delivery destination, program 122 instructs the autonomous vehicle (e.g., delivery device 140) to deposit the product at the delivery destination. In one embodiment, program 122 enables the autonomous vehicle to release the product at the delivery destination. For example, program 122 instructs the autonomous vehicle (e.g., delivery device 140) to open a storage chamber of the autonomous vehicle to release the product. In another example, program 122 instructs the autonomous vehicle to utilize an assembly arm of the autonomous vehicle to remove the product from a storage chamber of the autonomous vehicle. In yet another example, program 122 instructs the autonomous vehicle to release the product to the user in response to detecting a GPS beacon associated with the user.

In step 222, program 122 tracks the product for one or more alterations (e.g., one or more component parts were removed from the product to alter the product or one or more component parts were removed from the product to completely dismantle the product). In an embodiment, responsive to instructing the autonomous vehicle (e.g., delivery device 140) to deposit the product at the delivery destination, program 122 tracks the product for one or more alterations. In an embodiment, program 122 tracks the product for one or more alternations using the blockchain enabled system. In an embodiment, program 122 tracks the sequence of the disassembly of the product using the blockchain enabled system. In an embodiment, program 122 dynamically updates the insurance policy of the product using a smart contract rule.

In decision step 224, program 122 determines whether the product was altered (e.g., one or more component parts were removed from the product to alter the product or one or more component parts were removed from the product to completely dismantle the product). In an embodiment, responsive to tracking the product for one or more alterations, program 122 determines whether the product was altered. If program 122 determines the product was altered (decision 224, YES branch), then program 122 proceeds to step 226, disassociating the one or more component parts removed from the product from tracking. If program 122 determines the product was not altered (decision 224, NO branch), then program 122 returns to step 222 to continue tracking the product for one or more alterations.

In step 226, program 122 disassociates the one or more component parts removed from the product from tracking. In an embodiment, responsive to determining the product was altered, program 122 disassociates the one or more component parts removed from the product from tracking. In an embodiment, program 122 updates the eSIM profile of each component part of the one or more component parts removed from the product dynamically with a status of assembly of each component part. In an embodiment, program 122 enables the user to track the disassembly status of the one or more component parts removed from the product through user interface 132 of user computing device 130.

Figure 3:
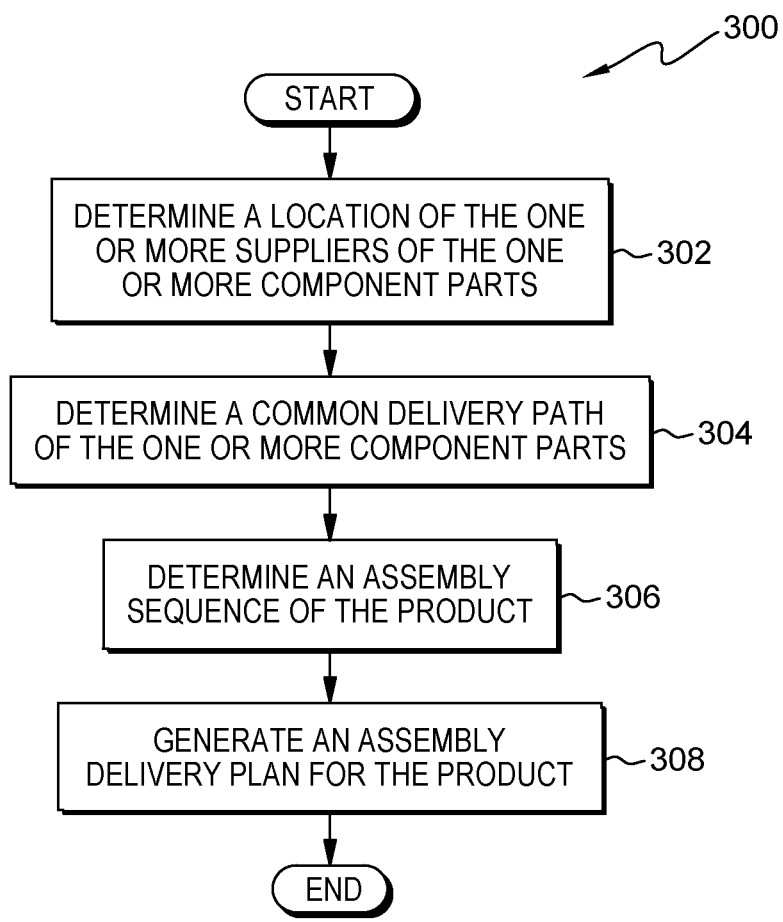
FIG. 3 is a flowchart illustrating an assembling component of the intelligent eSIM profile management program, on the server within the distributed data processing environment of FIG. 1, in accordance with an embodiment of the present invention.

FIG. 3 is a flowchart, generally designated 300, illustrating the assembling component (step 208) of intelligent eSIM profile management program 122, on server 120 within distributed data processing environment 100 of FIG. 1, in accordance with an embodiment of the present invention. In an embodiment, intelligent eSIM profile management program 122 coordinates the assembly of the product while in transit via an autonomous vehicle. It should be appreciated that the process depicted in FIG. 3 illustrates one possible iteration of the process flow, which may be repeated for each product assembled.

In step 302, program 122 determines a location of each of the one or more suppliers of the one or more component parts. In an embodiment, program 122 determines a location of each of the one or more suppliers from the BOM stored in the database (e.g., database 124) of the remote server (e.g., server 120). In an embodiment, program 122 extracts the location (e.g., an address, a geolocation, and a set of coordinates) of each of the one or more suppliers from the BOM. In another embodiment, program 122 determines a location of each of the one or more suppliers by utilizing a local network (e.g., network 110) to identify one or more computing devices (e.g., user computing device 130) of the one or more suppliers. In an embodiment, program 122 retrieves a geolocation of the one or more computing devices (e.g., user computing device 130) of the one or more suppliers. In another embodiment, program 122 determines a location of each of the one or more suppliers by utilizing the identification of one or more autonomous vehicles carrying different component parts of different products to communicate (e.g., context aware communications) and to coordinate with each other in transit as per a assembly sequence of each of the different products.

In step 304, program 122 determines a common delivery path of the one or more component parts of the product. In an embodiment, responsive to determining a location of each of the one or more suppliers of the one or more component parts, program 122 determines a common delivery path of the one or more component parts of the product. In various embodiments of the present invention, program 122 identifies delivery destinations of different products and locations of corresponding individual component parts. Then, program 122 can select a suitable delivery path to a delivery destination of the user so that the products can be assembled in transit based on the availability of required assembling time and optimized cost (e.g., composite distance travelled by one or more autonomous vehicles).

In one embodiment, program 122 identifies one or more routes from locations of instances of user computing device 130 to a delivery path of the product taken by one or more instances of delivery device 140 to a delivery destination. For example, program 122 identifies one or more routes from one or more suppliers (e.g., user computing device 130) of component parts of a product to a delivery path of the product to a delivery destination. Additionally, program 122 selects a route of the one or more routes for one or more autonomous vehicles (e.g., delivery device 140), which are travelling toward the delivery path, to transport individual component parts of the product to the delivery path for assembly.

In another example, program 122 inputs geolocations of identified suppliers (e.g., user computing device 130) of component parts (as discussed in step 302) required for assembly of a product and delivery destinations (e.g., address) of users into a machine learning model (e.g., artificial neural network) trained to identify common paths of one or more geolocations to determine a delivery path of the product. In this example, program 122 identifies a common route of an identified supplier of a component part of the product within a defined threshold distance of a delivery path to the delivery destination of a user. Additionally, program 122 can utilize an assembly sequence of the BOM of the product to determine the common routes available so that autonomous vehicles (e.g., delivery device 140) transporting the product can assemble the product or perform subassemblies in transit to the delivery destination.

In another embodiment, program 122 determines one or more assembly staging areas of a delivery route of one or more instances of delivery device 140. For example, program 122 inputs data (e.g., route clearance, velocity, weather conditions, wind velocity, precipitation, etc.) corresponding to an operating environment of an autonomous vehicle from an onboard sensor (e.g., sensor 144) into the machine learning model to identify suitable conditions of stable environments along a delivery path of a product for taxi maneuvers. In this example, program 122 determines whether a staging area (e.g., endpoint at a delivery path of a common route from a component supplier) for one or more autonomous vehicles to perform an assembly or sub-assembly is suitable based on conditions derived from the data along the delivery path.

Furthermore, program 122 identifies delivery route optimizations (e.g., parallel assemblies, sub-assembly, corresponding common routes, etc.), which reduce delivery time and/or assembly time, that allow for performing assembly tasks of an assembly sequence for the product in advance of a scheduled timeframe of the assembly sequence. For example, program 122 may utilize a three-dimensional (3D) printing module to print a component part in advance of an assembly sequence. By printing the component part in advance, program 122 may coordinate a schedule of one or more autonomous vehicles to assemble the product while in transit and/or to store assembled portions of the product until the assembled portions are needed (i.e., optimize a route by performing parallel assemblies of portions of a product to eliminate a need for identifying and traversing a common route).

In step 306, program 122 determines an assembly sequence of the product. In an embodiment, responsive to determining a common delivery path of the one or more component parts of the product, program 122 determines an assembly sequence of the product. In various embodiments of the present invention, an assembly sequence describes how and in what order to assemble various component parts of the product of the delivery request to produce the product. In one embodiment, program 122 determines an assembly sequence of the product of the delivery request using data from database 124.

For example, program 122 retrieves an assembly sequence of the product of the delivery request from a database, e.g., database 124. In this example, program 122 utilizes the BOM corresponding to the delivery request to identify an assembly sequence of the product of the delivery request. Additionally, program 122 utilizes the BOM corresponding to the delivery request to identify segments of the product comprised of one or more component parts that may be assembled concurrently with other segments of the product, in accordance with the assembly sequence of the BOM. Furthermore, program 122 inputs a sequence of assembly of the product, a relative position of autonomous vehicles (e.g., delivery device 140), possibilities of sub-assemblies into a machine learning model to generate context aware communication of the autonomous vehicles assembling the product. The context aware communication includes instructions to manage the coordination of two or more autonomous vehicles, the transfer of the BOM information of the product, and/or the transfer component parts of the product.

In another example, program 122 utilizes Artificial Intelligence (AI) and deep learning models (e.g., AI platform) to determine possible sequences for parallel and linear assembly to assemble the product while delivering the product to the user. In this example, program 122 inputs dynamic factors (e.g., wind speed, route clearance and stability) to utilize along with the physical component list of the BOM into the AI platform to obtain a recommended sequence and to optimize the time taken to build the product against the travel times.

In example embodiments, the AI platform is based on the dependency between 'k' and 'm' typically solved with forms of the cognitive computing and varying times 't' for the step of an assembly sequence. Also, the AI platform learns from different transactions (e.g., transfers of component parts, printing component parts, etc.), the possible ranges, and thus computing available route optimizations and assembly sequences:

$$S(p_1)=F\{(S(a_1), S(a_2) \ldots S(a_n)), t\} \qquad (1)$$

where 'S' is a sequence of assembly, '$p_n$' is the product of a function evaluated to the value 'n', '$a_n$' is a sub-assembly of a function evaluated to the value 'n', and 't' is the time for the completion of the step of the sequence of assembly; and $$S(a_1=F\{A(c_k), P(d_m, t), t\} \qquad (2)$$

where 'k' and 'm' are the component parts in the sub-assembly and 'm' belongs to 'k', where 'S' is a sequence of assembly, 'P' is in situ 3D printing on an autonomous vehicle of component part d, and 't' is the time for the completion of the step.

For example, program 122 utilizes the AI platform to identify the next component part for assembly of the product being assembled, and accordingly communicating with the nearest autonomous vehicle that includes the next component part to transfer the next component part to a candidate autonomous vehicle where assembly is in progress.

In step 308, program 122 generates an assembly delivery plan for the product. In an embodiment, responsive to determining an assembly sequence of the product, program 122 generates an assembly delivery plan for the product. In one embodiment, program 122 generates a delivery plan of delivery device 140 for the product of the delivery request. For example, program 122 uses a machine learning model (discussed in step 304) with variables covering various component parts, sub-assembly components, component parts that may be 3D printed in transit, one or more autonomous vehicles that can be coupled for assembly, interface/components that are part of coupling sub-assemblies, and/or time to assemble the product to identify optimization options (e.g., possible common delivery routes, staging areas, etc.) and generate a final delivery plan. In this example, program 122 can include in the final delivery plan a delivery path, staging areas, common delivery routes, and/or path optimizations so that one or more autonomous vehicles traveling along a delivery path to delivery destination in accordance with the final delivery plan can assemble one or more products while in transit. Additionally, the final delivery plan can determine an appropriate quantity of individual component parts to load in the one or more autonomous vehicles so that the one or more autonomous vehicles can use every component part required in preparing various products while receiving a supply of individual components from a warehouse of a supplier location when traveling towards the delivery destination or returning towards the warehouse.

Referring to FIG. 4, in an example embodiment, program 122 utilizes one or more instances of delivery device 140 to transport component parts 416 from a location of one or more instances of user computing device 130 to assemble generates an assembly delivery plan for the product unfinished product 418 or final product 420. In this example, program 122 uses one or more autonomous vehicles (e.g., delivery device 140) to retrieve one or more instances of component parts 416 from various locations. Additionally, the one or more instances of delivery device 140 utilize communications module 136 to transmit context aware communications to couple to one another and transfer and/or exchange one or more instances of component parts 416 for assembling unfinished product 418 or final product 420 according to respective bills of materials while traveling along common paths identified by program 122.

Referring to FIG. 4, in an example embodiment, program 122 utilizes delivery device 140 and component parts 416 to assemble one or more final products 420. In this example, program 122 utilizes assembly arm 414 and component parts 416 to construct unfinished product 418 or final product 420 in assembly chamber 412. Furthermore, delivery device 140 can include a temporary storage portion of assembly chamber 412 of received component parts 416 from another autonomous vehicle and use the received component parts 416 in assembling according to an assembly sequence of a corresponding delivery request. For example, component parts 416 can be a spring used for creating clock or a spring can also be used for creating a toy robot.

Figure 5:
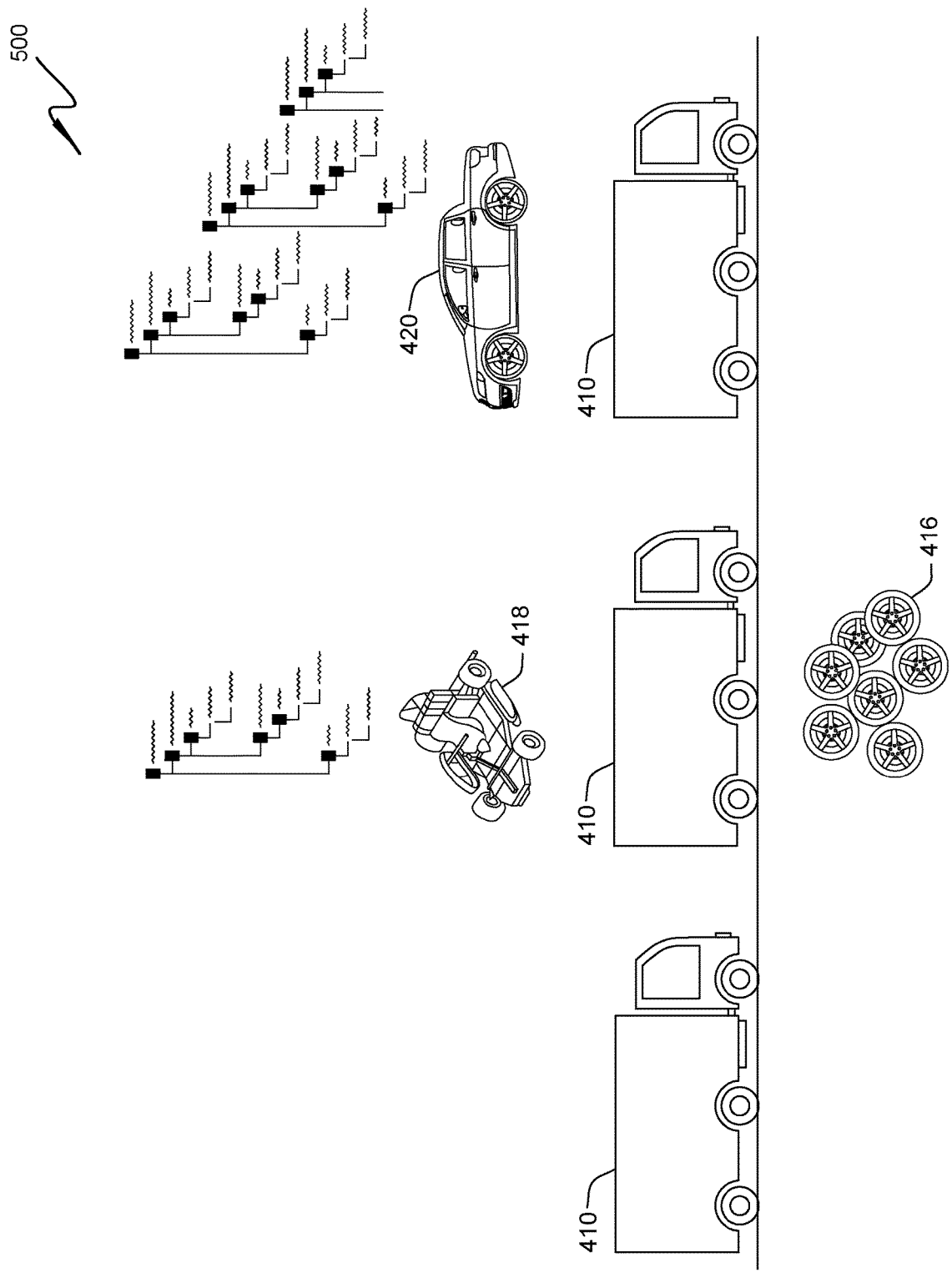
FIG. 5 depicts an example illustration of a delivery environment in which the intelligent eSIM profile management program operates, in accordance with example embodiments of the present invention.

FIG. 5 depicts an example illustration of delivery environment 500, in which program 122 operates, in accordance with example embodiments of the present invention. In this example, program 122 tracks a degree of progress of the sequence of assembly of component parts 416 using a blockchain enabled system. Program 122 reviews the eSIM profile of each component part 416 to identify the status of assembly of each component part 416 (i.e., unfinished product 418 or final product 420). Program 122 performs a digital twin simulation of the assembly of component parts 416 to determine whether the assembly of component parts 416 was completed as per the sequence of assembly. Program 122 creates a list detailing the sequence of assembly of component parts 416. Program 122 groups the eSIMs of component parts 416 used to assemble unfinished product 418 and final product 420 based on when each component part 416 is assembled in the sequence. Program 122 arranges each component part 416 to show the hierarchical relationship among component parts 416. Program 122 dynamically updates the eSIM profile of each component part 416 with the position given to each component part 416 in the sequence of assembly.

Figure 6:
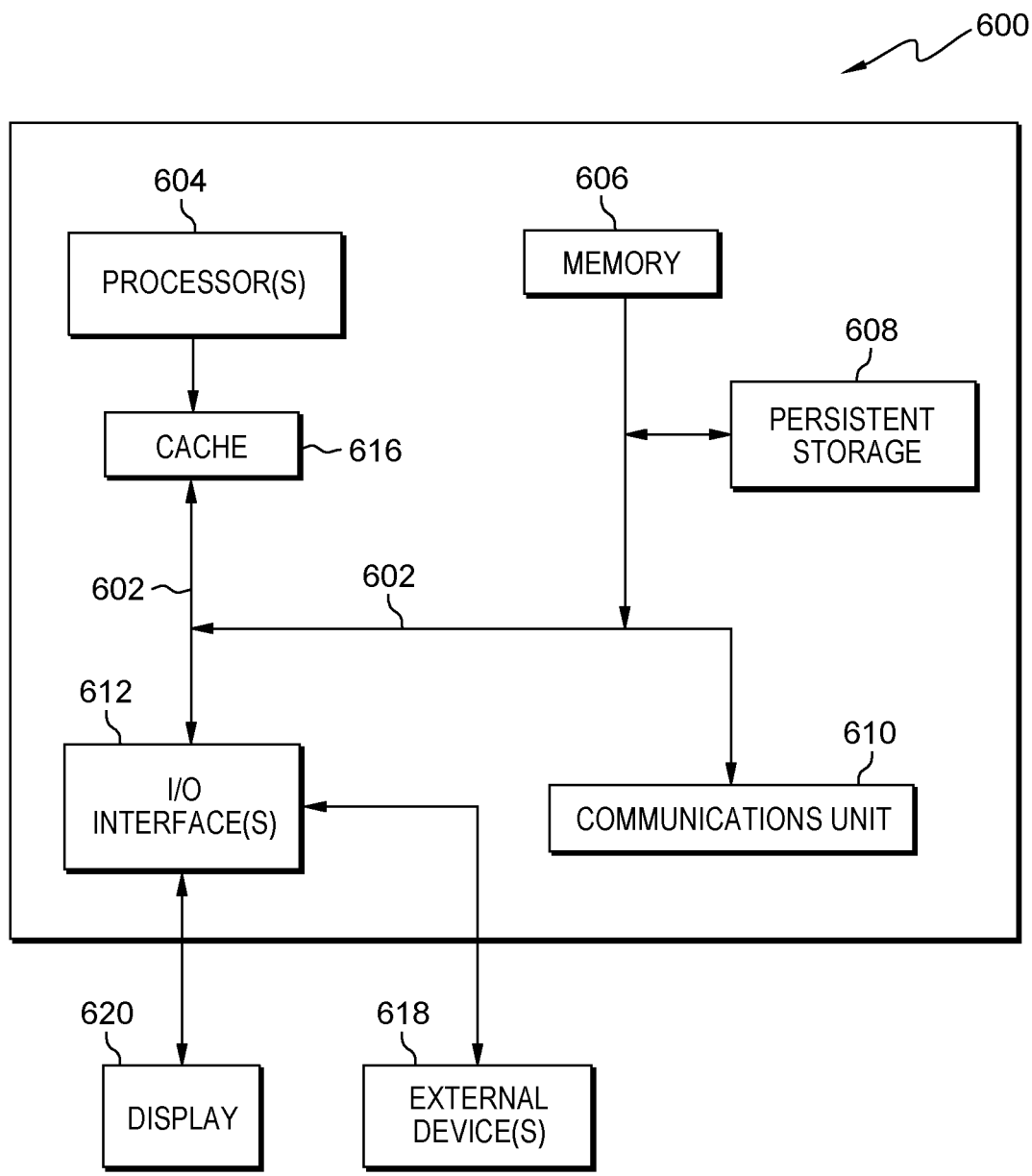
FIG. 6 is a block diagram illustrating the components of the server within the distributed data processing environment of FIG. 1, in accordance with an embodiment of the present invention.

FIG. 6 is a block diagram illustrating the components of computing device 600, suitable for server 120 running program 122 within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

As depicted, computing device 600 includes communications fabric 602, processor(s) 604, memory 606, persistent storage 608, communications unit 610, input/output (I/O) interface(s) 612, and cache 616. Communications fabric 602 provides communications between memory 606, persistent storage 608, communications unit 610, input/output (I/O) interface(s) 612, and cache 616. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a cross switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Program instructions and data (e.g., software and data 614) used to practice embodiments of the present invention may be stored in persistent storage 608 and in memory 606 for execution by one or more of the respective processor(s) 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608. Software and data 614 can be stored in persistent storage 608 for access and/or execution by one or more of the respective processor(s) 604 via cache 616. With respect to user computing device 130, software and data 614 includes user interface 132. With respect to server 120, software and data 614 includes program 122.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data (e.g., software and data 614) used to practice embodiments of the present invention may be downloaded to persistent storage 608 through communications unit 610.

I/O interface(s) 612 allows for input and output of data with other devices that may be connected to each computer system. For example, I/O interface(s) 612 may provide a connection to external device(s) 618, such as a keyboard, a keypad, a touch screen, and/or some other suitable input device. External device(s) 618 can also include portable computer readable storage media, such as, for example, thumb drives, portable optical or magnetic disks, and memory cards. Program instructions and data (e.g., software and data 614) used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a delivery request from a user to assemble and to deliver a product;
   identifying, by the one or more processors, one or more suppliers of one or more component parts of the product;
   coordinating, by the one or more processors, a sequence of assembly of the one or more component parts to assemble the product while in transit via an autonomous vehicle, wherein the one or more components parts contain one or more embedded SIMs (eSIMs) and the one or more eSIMs contains one or more eSIM profiles;
   tracking, by the one or more processors, a degree of progress of the sequence of assembly of the one or more component parts using a blockchain enabled system;
   responsive to determining whether the product is assembled, performing, by the one or more processors, a digital twin simulation of an assembly of the one or more component parts to determine whether the assembly of the one or more component parts was completed as per the sequence of assembly;
   subsequent to performing the digital twin simulation of the assembly of the one or more component parts to determine whether the assembly of the one or more component parts was completed as per the sequence of the assembly, creating, by the one or more processors, a list detailing the sequence of assembly of the one or more component parts of the product, wherein the list details an order in which the one or more component parts were assembled;
   determining whether the product is located at a delivery destination;
   responsive to having determined that the product is not located at the delivery destination, instructing the autonomous vehicle to deliver the product to the delivery destination;
   dynamically updating, by the one or more processors, an eSIM profile of the one or more eSIM profiles each component part of the one or more component parts of the product with a status of assembly of each component part.

2. The computer-implemented method of claim 1, further comprising:
   grouping, by the one or more processors, one or more eSIM profiles based on a position of the eSIM profile in the sequence of assembly of the product; and
   arranging, by the one or more processors, the one or more eSIM profiles to show a hierarchical relationship among the one or more component parts of the product.

3. The computer-implemented method of claim 1, further comprising:
   updating, by the one or more processors, an insurance policy of the product using a smart contract rule based on the determination that the product is assembled.

4. The computer-implemented method of claim 1, further comprising:
   subsequent to updating dynamically the eSIM profile of each component part of the one or more component parts of the product with the status of assembly of each component part, tracking, by the one or more processors, the product for one or more alterations using the blockchain enabled system;
   determining, by the one or more processors, whether the product was altered;
   responsive to determining the product was altered, disassociating, by the one or more processors, the one or more component parts removed from the product from tracking; and dynamically updating, by the one or more processors, the eSIM profile of each component part of the one or more component parts of the product with the status of assembly of each component part.

5. The computer-implemented method of claim 1, wherein receiving the delivery request from the user to assemble and to deliver the product further comprises:
analyzing, by the one or more processors, the delivery request using a Natural Language Processing technique;
identifying, by the one or more processors, the product;
identifying, by the one or more processors, a bill of materials of the product; and
extracting, by the one or more processors, textual data from the delivery request and the bill of materials of the product.

6. The computer-implemented method of claim 5, wherein the textual data extracted from the bill of materials of the product includes information corresponding to the delivery destination of the product, a delivery date of the product, a location of one or more suppliers of the one or more component parts, and an identifier of one or more autonomous vehicles that will assemble and deliver the one or more component parts.

7. The computer-implemented method of claim 1, wherein coordinating the sequence of assembly of the one or more component parts to assemble the product while in transit via the autonomous vehicle further comprises:
determining, by the one or more processors, one or more common delivery routes of the one or more component parts of the product, wherein the one or more common delivery routes of the one or more component parts of the product include one or more respective routes from a location of the one or more suppliers to the delivery destination of the product; and
determining, by the one or more processors, a delivery route to the delivery destination of the product based at least in part on the one or more common delivery routes, wherein determining the delivery route to the delivery destination of the product further comprises:
identifying, by the one or more processors, a route from a first supplier of the one or more suppliers of the one or more component parts to the delivery route to the delivery destination of the product;
inputting, by the one or more processors, a geolocation of the one or more suppliers of the one or more component parts and the delivery destination of the product into a machine learning model; and
responsive to receiving an output corresponding to an input of the geolocation of the one or more suppliers of the one or more component parts and the delivery destination of the product into the machine learning model, identifying, by the one or more processors, the one or more common delivery routes of a plurality of respective routes within a predetermined threshold distance to the delivery route.

8. A computer program product comprising:
one or more computer readable storage media and program instructions stored on the one or more computer readable storage media, the program instructions comprising:
program instructions to receive a delivery request from a user to assemble and to deliver a product;
program instructions to identify one or more suppliers of one or more component parts of the product;
program instructions to coordinate a sequence of assembly of the one or more component parts to assemble the product while in transit via an autonomous vehicle, wherein the one or more components parts contain one or more embedded SIMs (eSIMs) and the one or more eSIMs contains one or more eSIM profiles;
program instructions to track a degree of progress of the sequence of assembly of the one or more component parts using a blockchain enabled system;
responsive to determining whether the product is assembled, program instructions to perform a digital twin simulation of an assembly of the one or more component parts to determine whether the assembly of the one or more component parts was completed as per the sequence of assembly;
subsequent to performing the digital twin simulation of the assembly of the one or more component parts to determine whether the assembly of the one or more component parts was completed as per the sequence of the assembly, program instructions to create, a list detailing the sequence of assembly of the one or more component parts of the product, wherein the list details an order in which the one or more component parts were assembled;
program instructions to determine whether the product is located at a delivery destination;
responsive to having determined that the product is not located at the delivery destination, program instructions to instruct the autonomous vehicle to deliver the product to the delivery destination;
and
program instructions to dynamically update an eSIM profile of each component part of the one or more component parts of the product with a status of assembly of each component part.

9. The computer program product of claim 8, further comprising:
program instructions to group one or more eSIM profiles based on a position of the eSIM profile in the sequence of assembly of the product; and
program instructions to arrange the one or more eSIM profiles to show a hierarchical relationship among the one or more component parts of the product.

10. The computer program product of claim 8, further comprising:
program instructions to update an insurance policy of the product using a smart contract rule based on the determination that the product is assembled.

11. The computer program product of claim 8, further comprising:
subsequent to updating dynamically the eSIM profile of each component part of the one or more component parts of the product with the status of assembly of each component part, program instructions to track the product for one or more alterations using the blockchain enabled system;
program instructions to determine whether the product was altered;
responsive to determining the product was altered, program instructions to disassociate the one or more component parts removed from the product from tracking; and
program instructions to dynamically update the eSIM profile of each component part of the one or more component parts of the product with the status of assembly of each component part.

12. The computer program product of claim 8, wherein receiving the delivery request from the user to assemble and to deliver the product further comprises:

program instructions to analyze the delivery request using a Natural Language Processing technique;
program instructions to identify the product;
program instructions to identify a bill of materials of the product; and
program instructions to extract textual data from the delivery request and the bill of materials of the product.

13. The computer program product of claim 12, wherein the textual data extracted from the bill of materials of the product includes information corresponding to a delivery destination of the product, a delivery date of the product, a location of one or more suppliers of the one or more component parts, and an identifier of one or more autonomous vehicles that will assemble and deliver the one or more component parts.

14. The computer program product of claim 8, wherein coordinating the sequence of assembly of the one or more component parts to assemble the product while in transit via the autonomous vehicle further comprises:
program instructions to determine one or more common delivery routes of the one or more component parts of the product, wherein the one or more common delivery routes of the one or more component parts of the product include one or more respective routes from a location of the one or more suppliers to the delivery destination of the product; and
program instructions to determine a delivery route to the delivery destination of the product based at least in part on the one or more common delivery routes, wherein determining the delivery route to the delivery destination of the product further comprises:
program instructions to identify a route from a first supplier of the one or more suppliers of the one or more component parts to the delivery route to the delivery destination of the product;
program instructions to input a geolocation of the one or more suppliers of the one or more component parts and the delivery destination of the product into a machine learning model; and
responsive to receiving an output corresponding to an input of the geolocation of the one or more suppliers of the one or more component parts and the delivery destination of the product into the machine learning model, program instructions to identify the one or more common delivery routes of a plurality of respective routes within a predetermined threshold distance to the delivery route.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive a delivery request from a user to assemble and to deliver a product;
program instructions to identify one or more suppliers of one or more component parts of the product;
program instructions to coordinate a sequence of assembly of the one or more component parts to assemble the product while in transit via an autonomous vehicle;
program instructions to track a degree of progress of the sequence of assembly of the one or more component parts using a blockchain enabled system;
responsive to determining whether the product is assembled, program instructions to perform a digital twin simulation of an assembly of the one or more component parts to determine whether the assembly of the one or more component parts was completed as per the sequence of assembly;
subsequent to performing the digital twin simulation of the assembly of the one or more component parts to determine whether the assembly of the one or more component parts was completed as per the sequence of the assembly, program instructions to create, a list detailing the sequence of assembly of the one or more component parts of the product, wherein the list details an order in which the one or more component parts were assembled;
program instructions to determine whether the product is located at a delivery destination;
responsive to having determined that the product is not located at the delivery destination, program instructions to instruct the autonomous vehicle to deliver the product to the delivery destination;
program instructions to dynamically update an eSIM profile of each component part of the one or more component parts of the product with a status of assembly of each component part.

16. The computer system of claim 15, further comprising:
program instructions to group one or more eSIM profiles based on a position of the eSIM profile in the sequence of assembly of the product; and
program instructions to arrange the one or more eSIM profiles to show a hierarchical relationship among the one or more component parts of the product.

17. The computer system of claim 15, further comprising:
program instructions to update an insurance policy of the product using a smart contract rule based on the determination that the product is assembled.

18. The computer system of claim 15, further comprising:
subsequent to updating dynamically the eSIM profile of each component part of the one or more component parts of the product with the status of assembly of each component part, program instructions to track the product for one or more alterations using the blockchain enabled system;
program instructions to determine whether the product was altered;
responsive to determining the product was altered, program instructions to disassociate the one or more component parts removed from the product from tracking; and
program instructions to dynamically update the eSIM profile of each component part of the one or more component parts of the product with the status of assembly of each component part.

19. The computer system of claim 15, wherein receiving the delivery request from the user to assemble and to deliver the product further comprises:
program instructions to analyze the delivery request using a Natural Language Processing technique;
program instructions to identify the product;
program instructions to identify a bill of materials of the product; and
program instructions to extract textual data from the delivery request and the bill of materials of the product.

20. The computer system of claim 15, wherein coordinating the sequence of assembly of the one or more component parts to assemble the product while in transit via the autonomous vehicle further comprises:
program instructions to determine one or more common delivery routes of the one or more component parts of the product, wherein the one or more common delivery routes of the one or more component parts of the product include one or more respective routes from a location of the one or more suppliers to the delivery destination of the product; and program instructions to determine a delivery route to the delivery destination of the product based at least in part on the one or more common delivery routes, wherein determining the delivery route to the delivery destination of the product further comprises:

program instructions to identify a route from a first supplier of the one or more suppliers of the one or more component parts to the delivery route to the delivery destination of the product;

program instructions to input a geolocation of the one or more suppliers of the one or more component parts and the delivery destination of the product into a machine learning model; and responsive to receiving an output corresponding to an input of the geolocation of the one or more suppliers of the one or more component parts and the delivery destination of the product into the machine learning model, program instructions to identify the one or more common delivery routes of a plurality of respective routes within a predetermined threshold distance to the delivery route.

\* \* \* \* \*